L. ZWENG.
MEANS FOR ADJUSTING THE LEGS OF COMPASSES.
APPLICATION FILED OCT. 28, 1911.

1,042,866.

Patented Oct. 29, 1912.

Witnesses:
W. W. Williams
H. Cornwall

Inventor:
Ludwig Zweng
Attorney

UNITED STATES PATENT OFFICE.

LUDWIG ZWENG, OF PFRONTEN-STEINACH, GERMANY.

MEANS FOR ADJUSTING THE LEGS OF COMPASSES.

1,042,866.  Specification of Letters Patent.  Patented Oct. 29, 1912.

Application filed October 28, 1911. Serial No. 657,345.

*To all whom it may concern:*

Be it known that I, LUDWIG ZWENG, a subject of the German Emperor, and resident of Pfronten-Steinach, Germany, have invented certain new and useful Improvements in Means for Adjusting the Legs of Compasses, of which the following is a specification.

This present invention relates to means for adjusting the legs of compasses.

The object of my present invention is to provide simple, economical and efficient means for adjusting the legs of a compass, and holding the same in set position.

Figure 1:
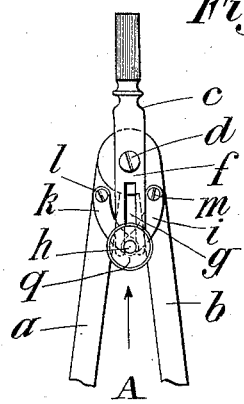
Figure 2:
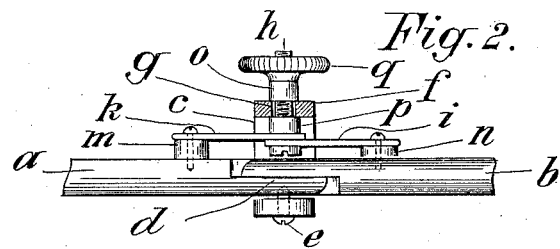
Figure 3:
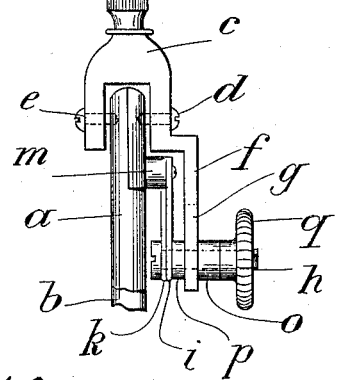

In the accompanying drawings: Figure 1 is a side elevation of my improvement in use. Fig. 2 is an enlarged view looking in the direction of the arrow A in Fig. 1. Fig. 3 is an edge view.

$a$ and $b$ indicate the legs of a compass and pivoted thereto at $d$—$e$ is a yoke $c$. Depending from one side of the yoke $c$ off-set, is an extension $f$ formed at its lower end with a slot $g$. Pivoted to the leg $a$ at $l$ is a curved arm $k$ and to the leg $b$ is pivoted at $m$ a similar arm $i$. The lower ends of the curved arms $i$ and $k$ are provided with openings through which and the slot $g$ passes a screw $h$. Engaging the screw $h$ is a nut $q$ between which and the extension and between the latter and the head of the screw are washers $o$ and $p$.

In operation assume the parts are positioned as shown in Fig. 1 and it is desired to adjust the legs $a$—$b$. The nut $q$ is released, and then using the nut as a finger grip, the screw $h$ is moved up or down in the slot $g$ according to the desired adjustment required. When the screw is moved up or down, it also turns the curved arms $i$ and $k$ on their pivots and consequently simultaneously moves the legs $a$ and $b$. After the legs have been properly set the nut $q$ is tightened to again bind the curved arms against the extension $f$ and therefore hold the legs in set position.

What I claim is:

1. In a compass the combination of the pivoted legs, a yoke pivoted to the legs, said yoke having an extension formed with a slot, arms pivoted to the legs, a threaded pivot connecting the two arms and passing through the slot in the extension, and an adjusting nut engaging the threaded pivot to lock the arms and the legs in set position.

2. In a compass, the combination of the pivoted legs, a yoke pivoted to the legs, said yoke having an off-set extension formed at its free end with an open end slot, an arm pivoted to each leg, a screw connecting the ends of the two arms and passing through the open slot, and a nut engaging the screw to bind the arms in set position against the extension.

In testimony whereof I have hereunto set my hand in presence of two witnesses.

LUDWIG ZWENG.

Witnesses:
 MATHILDE K. HELD,
 LUDWIG VOLLENBACK.

---

Copies of this patent may be obtained for five cents each, by addressing the "Commissioner of Patents, Washington, D. C."